Aug. 2, 1927.

M. D. SIMPSON 1,637,968

FLUID TRANSMISSION

Filed April 19, 1927   2 Sheets-Sheet 1

WITNESSES

INVENTOR
Mayroe D. Simpson
BY
ATTORNEY

Aug. 2, 1927.

M. D. SIMPSON 1,637,968

FLUID TRANSMISSION

Filed April 19, 1927

WITNESSES

INVENTOR
Mayroe D. Simpson
BY
ATTORNEY

Patented Aug. 2, 1927.

1,637,968

UNITED STATES PATENT OFFICE.

MAYROE DEXTER SIMPSON, OF BROOKLYN, NEW YORK.

FLUID TRANSMISSION.

Application filed April 19, 1927. Serial No. 185,025.

This invention relates to fluid transmission.

An object of the invention is to provide between the drive shaft and the driven shaft a fluid transmission which can be controlled by a foot pedal or other device so as to gradually increase or decrease the speed of the transmission.

My improved device is designed primarily as a substitute for the gear shift and clutch mechanism of an automobile, and provides a fluid transmission which can be controlled by a single member so as to vary the speed from "high" to "low" or permit the engine to run idly or in "neutral" as it is commonly known.

A further object is to provide a fluid transmission of this character which will occupy but very small space and which will be most efficient in the performance of its functions.

With these and other objects in view, the invention consists in certain novel features of construction and combinations and arrangements of parts, which will be more fully hereinafter described and pointed out in the claims.

In the accompanying drawings—

Figure 1:
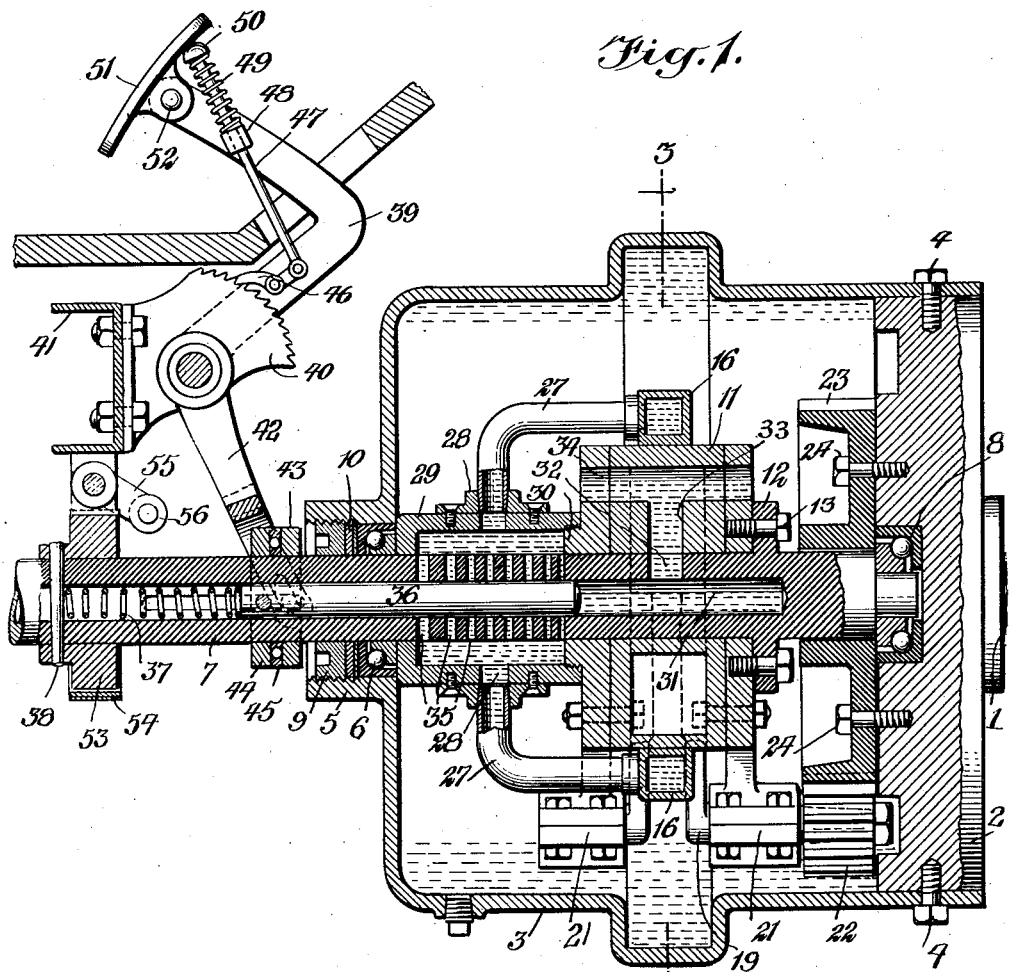
Figure 1 is a view in longitudinal section, illustrating my improved fluid transmission.
Figure 2:
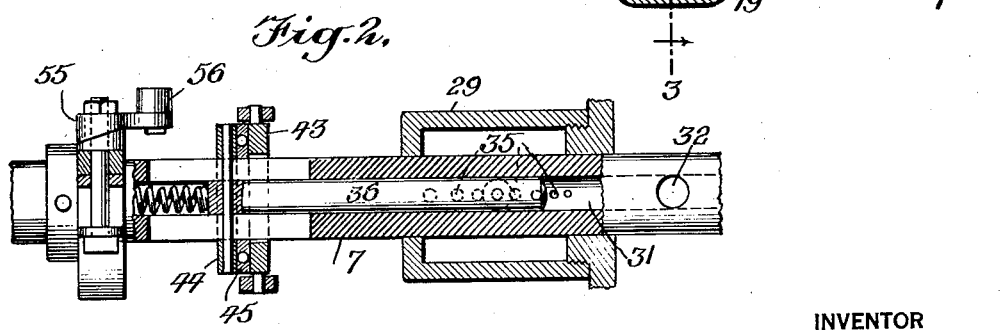
Figure 2 is a view in longitudinal section through the driven shaft, commonly known as a transmission shaft, and co-operating parts, the view being taken at right angles to Figure 1.
Figure 3:
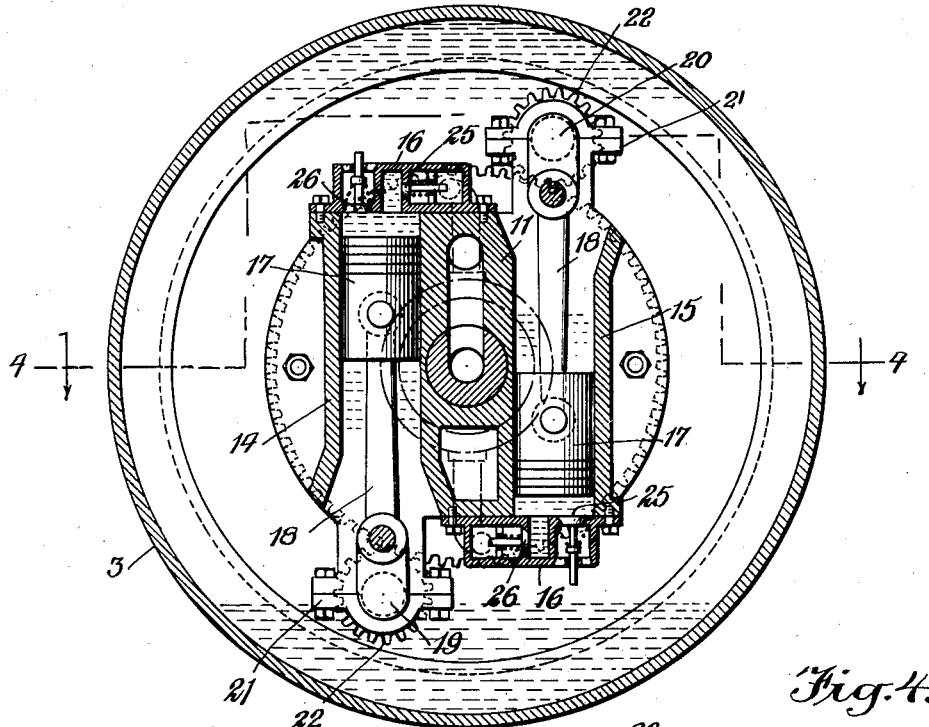
Figure 3 is a view in transverse section on the line 3—3 of Figure 1.
Figure 4:
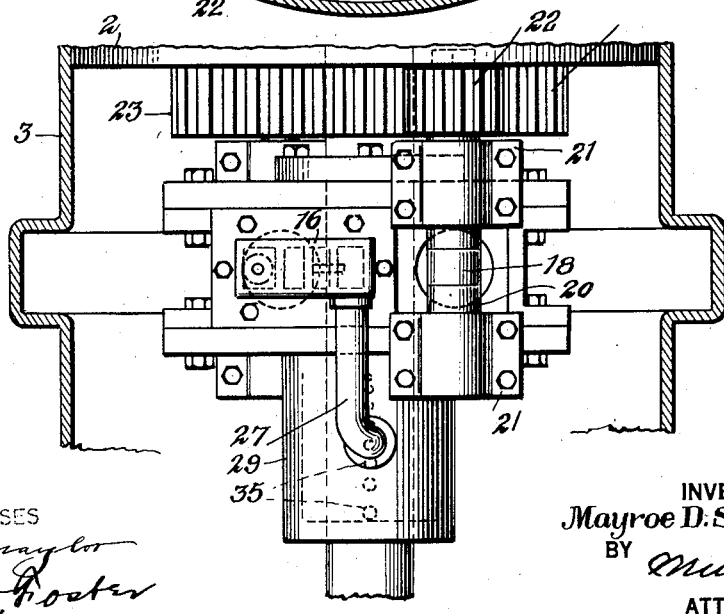
Figure 4 is a view in longitudinal section on the staggered line 4—4 of Figure 3.

1 represents the drive shaft which may be driven by any suitable motor, and as above stated we will assume that this is the drive shaft of an engine for propelling an automobile as this is the primary use of the transmission. 2 represents a flywheel fixed to the drive shaft and on this flywheel a casing 3 is secured, screws 4 being illustrated for the purpose.

The casing 3 is of general cylindrical form and has an internally screw-threaded nipple 5 at one end in which an anti-friction bearing 6 is mounted and provides bearing for the driven shaft 7. This driven shaft 7 has a thrust bearing 8 in the center of the flywheel 2, and this bearing is also preferably anti-friction, as illustrated. A backing nut 9 is screwed into the nipple 5 with suitable gaskets 10 interposed between the nut and the bearing 6 to insure a liquid and air-tight juncture between the parts to allow free turning movement of the driven shaft.

On the driven shaft 7 within the casing 3 a cylinder block 11 is located and is rigidly secured to turn with the shaft. As a means to this end I have provided an annular flange 12 on the shaft 7 with screws 13 projected therethrough and screwed into the block 11, but of course this connection is capable of modification.

The cylinder block 11 is made with parallel cylinders 14 and 15, the heads 16 of these cylinders being oppositely disposed, and plungers 17 are mounted to reciprocate in these cylinders and have connecting rods 18 connecting them with crank shafts 19 and 20, respectively. These crank shaft 19 and 20 are mounted in bearings 21 constituting portions of the cylinder block 11, and the crank shafts 19 and 20 have pinions 22 fixed thereon to engage the teeth of a ring gear or rack 23 which is fixed to the face of the flywheel 2. I have illustrated screws 24 extending through the ring gear and screwed into the flywheel as coupling means for these parts but it is of course to be understood that various other securing means might be employed.

Each cylinder 14 and 15 has in its head inlet and outlet check valves 25 and 26, respectively, the inlet valves normally closing ports in open communication with the casing 3 and the outlet valves normally closing the communication between the cylinders and pipes or passages 27. These pipes communicate with ports 28 in the walls of a jacket 29 which encloses a portion of shaft 7 and is secured to the cylinder block 11.

I have illustrated the cylinder block 11 as having a screw-threaded projection 30 with which the internally threaded end of the jacket 29 engages to couple the parts, and I have shown the other end of the jacket as having a close fitting juncture with the transmission, but it is to be understood of course that this jacket may be otherwise mounted so that it will form a chamber with which the pipes 27 communicate and through which the shaft 7 projects.

The shaft 7 has a longitudinal bore 31 with an opening 32 therein communicating with a radial opening 33 in the block 11, and this radial opening 33 communicates with an opening 34 extending entirely through the block and in open communication with the casing.

I have referred to the part 11 as a block. It may of course be made, and preferably is made, of several sections rigidly secured together but for all intents and purposes it is a single unitary member, and for convenience of description I shall use this term "block" to define the same.

Moreover, by reference to the drawings it will be noted that only the central portion of the block is an integral portion, and the end portions constitute separate members rigidly secured thereto and carrying bearings 21 of the crank shafts 19 and 20.

The shaft 7 within the jacket 29 is provided with a longitudinal series of by-pass ports 35 connecting the longitudinal bore 31 thereof with the chamber formed by the jacket 29. These by-pass ports may be spaced as desired but preferably increase in size in regular sequence.

The passage or flow of fluid through these by-pass ports is controlled by a plunger valve 36 which fits the bore 31 of shaft 7 and is movable longitudinally in said bore. The movement of this plunger controls the transmission, as will be more fully hereinafter explained, and I may of course employ various forms of mechanism for moving the plunger, but I have illustrated and shall describe a simple form of mechanism which is well adapted for the purpose.

First of all, I provide back of the valve 36 a coil spring 37 which is located in the bore 31 between the valve and a cross pin 38, normally moving the valve to the position shown in Figure 1. 39 represents a foot lever which is pivotally connected to a ratchet segment 40 fixed to the chassis 41 or other portion of the automobile.

This lever has a forked crank arm thereon which engages a collar 43 movable on the shaft 7. 44 represents a disk or ring which is fixed to the shaft 7, and 45 illustrates antifriction bearings interposed between the collar 43 and the ring 44 so as to reduce friction to a minimum.

The ratchet segment 40 is engaged by a pawl 46 carried by the lever 39 and operatively connected to a rod 47 mounted to slide on a bracket 48 and having a coil spring 49 thereon between the bracket 48 and a head or button 50 on the end of the rod to normally hold the ratchet in engagement with the segment.

51 represents a pedal which is pivotally connected to the end of the lever 39, as shown at 52, and this pedal engages the head 50 of the rod 47 so that the operator can by the movement of his foot cause the ball to be released from the ratchet segment 40 whenever desired.

On the shaft 7 I preferably provide a brake disk 53 having a brake band 54 thereon, the latter operated by a cam arm 55 to contract and expand the brake band. It is understood that this brake is normally off and that the brake arm 55 has a roller 56 in the path of movement of the arm 42. When the arm 42 moves the valve 36 to a position to allow the engine to idle, which would be a neutral position when the gears are employed, the arm 42 will engage roller 56 to cause the arm 55 to swing and contract the brake band 54 and stop any movement of the shaft 7.

The casing 3 and all ports and passages of the several parts within the casing 3 are filled with fluid, and I preferably employ oil as a fluid.

The operation is as follows:

Figure 1 illustrates the parts in "high". In other words, the drive shaft and the driven shaft are locked to turn together with no lost motion. This is due to the fact the valve 36 is in position to close all of the by-pass ports 35, and the plunger 17 in the cylinders 14 and 15, respectively, cannot move the oil and therefore are held stationary. As these plungers cannot move, the crank arms 19 and 20 cannot turn and the pinions 22 are held against rotary movement so that the pinions 22 and the ring gear 23 are locked together with the flywheel 2 so that all of the parts revolve at the speed of the drive shaft. The speed of transmission is reduced in exact proportion to the movement of the valve 36 to the left of Figure 1. This movement of the valve is brought about through the medium of the lever 39 and crank arm 42, as above explained. Such movement, namely to the left of Figure 1, uncovers in succession the several by-pass ports 35. As these by-pass ports are uncovered or opened the plungers 17 can move. Hence motion is transmitted as follows:

The turning movement of the flywheel 2 through the medium of the ring gear 23 turns pinions 22 and the crank shafts 19 and 20. As these crank shafts turn, the plungers 17 are reciprocated, drawing the oil past the inlet ports 26 and forcing the oil through the pipes or passages 27, jacket 29, by-pass ports 35, bore 31, opening 32 and opening 34 back into the casing 3. The freedom of movement of the plungers is of course regulated by the number of by-pass ports 35 which are open, and it is to be understood that these by-pass ports are so proportioned that the transmission speed will be varied smoothly and in proper degree until the valve opens all of the by-pass ports, when the plunger can move with such freedom that no motion can be transmitted from the drive shaft to the driven shaft.

In the movement of the lever 39 the pawl 46 will hold the same against return movement by reason of its engagement with the segment 40, and as the parts reach neutral position the brake will be applied to stop any movement of the driven shaft 7. When it is desired to again start, the pedal 51 is operated to release the pawl 46, and the spring 37 will move the valve to the right of Figure 1 and gradually close the by-pass ports 35 so as to gradually increase the speed of transmission, as will be readily understood.

While I have illustrated what I believe to be a preferred embodiment of my invention, it is obvious that various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A fluid transmission, including a casing adapted to be filled with fluid, a gear in the casing fixed to turn with the drive shaft, and a driven shaft projecting into the casing and having a longitudinal bore therein, a cylinder block mounted to turn with the driven shaft and having a cylinder therein, a crank shaft carried by the block, a plunger in the cylinder operatively connected to the crank shaft, a pinion on said crank shaft engaging the gear, a jacket around a portion of said driven shaft, said driven shaft having within said jacket a series of by-pass ports communicating with the bore thereof, a valve movable in the bore of the driven shaft and adapted to open and close said by-pass ports, and inlet and outlet check valves communicating with said cylinder, the outlet ports communicating with the jacket, and the bore of said driven shaft having open communication with the interior of the casing.

2. A fluid transmission, including a casing adapted to be filled with fluid and adapted to be secured to a flywheel constituting a driving element, a driven shaft projecting into the casing, a gear on the flywheel, a cylinder block fixed to the driven shaft and having a pair of parallel cylinders therein, crank shafts on the block, plungers in the cylinders operatively connected to the crank shafts, pinions on the crank shafts meshing with the gear, and by-pass controlling means between the cylinders and the interior of the casing, said means including a series of ports in the driven shaft and a valve movable in the shaft to control said passages.

3. A fluid transmission, including a casing adapted to be filled with fluid and adapted to be secured to a flywheel constituting a driving element, a driven shaft projecting into the casing, a gear on the flywheel, a cylinder block fixed to the driven shaft and having a pair of parallel cylinders therein, crank shafts on the block, plungers in the cylinders operatively connected to the crank shafts, pinions on the crank shafts meshing with the gear, said cylinders having valved inlet and outlet ports, the inlet ports communicating with the interior of the casing, a jacket enclosing a portion of the driven shaft, pipes communicating with said passages and in communication with the outlet ports of the cylinders, said driven shaft having by-pass ports therein communicating with the interior of the casing, and a valve controlling said by-pass ports.

4. A fluid transmission, including a casing adapted to be secured to a flywheel constituting a driving element, a driven shaft projecting into the casing, a gear on the flywheel, a cylinder block fixed to the driven shaft and having a pair of parallel cylinders therein, crank shafts on the block, plungers in the cylinders operatively connected to the crank shafts, pinions on the crank shafts meshing with the gear, said cylinders having valved inlet and outlet ports, the inlet ports communicating with the interior of the casing, a jacket enclosing a portion of the driven shaft, pipes communicating with said passages and in communication with the outlet ports of the cylinders, said driven shaft having a longitudinal bore communicating with the interior of the casing and having radial by-pass ports therethrough located within the jacket, and a valve movable in the bore of the driven shaft to open and close said by-pass ports.

5. A fluid transmission, including a casing adapted to be secured to a flywheel constituting a driving element, a driven shaft projecting into the casing, a gear on the flywheel, a cylinder block fixed to the driven shaft and having a pair of parallel cylinders therein, crank shafts on the block, plungers in the cylinders operatively connected to the crank shafts, pinions on the crank shafts meshing with the gear, said cylinders having valved inlet and outlet ports, the inlet ports communicating with the interior of the casing, a jacket enclosing a portion of the driven shaft, pipes communicating with said passages and in communication with the outlet ports of the cylinders, said driven shaft having a longitudinal bore communicating with the interior of the casing and having radial by-pass ports therethrough located within the jacket, a valve movable in the bore of the driven shaft to open and close said by-pass ports, a spring exerting pressure on said valve normally closing all of said by-pass ports, and a pedal adapted to move said valve in the opposite direction to open said by-passes in regular succession.

6. A fluid transmission including a fluid casing constituting a prime mover, a driven shaft projecting into the casing, a cylinder fixed to turn with the shaft, a plunger in the cylinder, a crank shaft carried by the cylinder and operatively connected to the plunger, a gear fixed to turn with the casing, a pinion on the crank shaft engaging the gear, said driven shaft having by-pass passages therein in communication with the outlet of the cylinder, and a valve controlling said by-pass passages.

7. A fluid transmission, including a fluid filled casing constituting a prime mover, a driven shaft projecting into the casing, a cylinder fixed to turn with the shaft, a plunger in the cylinder, a crank shaft carried by the cylinder and operatively connected to the plunger, a gear fixed to turn with the casing, a pinion on the crank shaft engaging the gear, said driven shaft having by-pass passages therein in communication with the outlet of the cylinder, said driven shaft having a longitudinal bore through which said by-pass passages communicate, and a plunger valve movable in the bore and adapted to open and close said passages in regular succession.

MAYROE DEXTER SIMPSON.